INVENTORS
LAWRENCE P. HORWITZ
RICHARD M. KARP
BY Francis J. Thomas
ATTORNEY

Aug. 29, 1967 L. P. HORWITZ ETAL 3,339,182

OPTIMUM RESULT COMPUTER

Filed June 30, 1964 10 Sheets-Sheet 9

RING COUNTER

United States Patent Office 3,339,182

Patented Aug. 29, 1967

3,339,182

OPTIMUM RESULT COMPUTER

Lawrence P. Horwitz, Chappaqua, and Richard M. Karp, Bronx, N.Y., assignors to International Business Machines Corporation, New York, N.Y., a corporation of New York Filed June 30, 1964, Ser. No. 379,221
12 Claims. (Cl. 340—172.5)

ABSTRACT OF THE DISCLOSURE

Computing apparatus especially adapted to determine the manner in which a sheet of paper or other flat stock should be cut or divided in order to insure an optimum return from the sale of the divided stock. The apparatus is designed to perform a nonexhaustive iterative process. In general, the interim results of the data computations determine the addresses at which further input data are sought in order to achieve an optimum result with a minimum number of computing operations.

*Background of invention*

This invention relates to a computer organization and, in particular, to an organization wherein data selection for subsequent calculations is controlled by the results of previous calculations or by the structure of the results of prior calculations.

Present-day digital computers are generally organized in accordance with the principles outlined by Arthur W. Burks, Herman H. Goldstine, and John von Neumann in Preliminary Discussion of the Logical Design of an Electronic Computing Instrument, a report prepared for the Research and Development Service, Ordnance Department, U.S. Army, in June 1946. Although this organization is well suited for general purpose computers, many problems can be more effectively solved by other machine organizations. In particular, certain iterative problem-solving techniques are extremely time consuming on traditional computers because they require a large number of memory access cycles for relatively little computation.

*Summary of the invention*

In the present invention, input data is selected by a control circuit and interim results are obtained. The results and the relationship between the results are then analyzed and altered according to a predetermined algorithm. The altered data then affects the control circuit which selects input data for the next stage of the calculations. This process is iterated (repeated) in accordance with the algorithm to produce the final solution to the problem. The inventive computer organization is extremely efficient in solving those problems wherein the structure of the interim solution (the relationship between results in the solution) controls the operations and operands to be used in the succeeding steps toward the solution.

One example of a problem of this type is a stock-cutting problem, wherein a quantity of material is to be cut into a number of smaller pieces in a manner that provides the greatest financial return to the user. As an example, consider the problem of determining a cutting pattern when sheets of material having a length L equal to 17 inches are to be cut into one or more of the following prescribed lengths $l_i$ having corresponding prices $p_i$

| | |
|---|---|
| $l_1=7''$ | $p_1=\$.90$ |
| $l_2=8''$ | $p_2=1.00$ |
| $l_3=4''$ | $p_3=.40$ |
| $l_4=3''$ | $p_4=.20$ |
| $l_5=1''$ | $p_5=.02$ |

In the above table, the sizes and prices are listed in the order of "return per unit length." Thus, the 7″ length ($l_1$) precedes the 8″ length ($l_2$) because the 7" lengths provide a return of \$.128 per unit length, whereas the 8″ lengths provide a return of \$.125. In this problem, the greatest return is obtained by cutting the total length (L) into two 8″ pieces ($l_2$) and one 1″ piece ($l_5$) to give a return of \$2.02 per sheet.

The solution of this problem can be obtained exhaustively by calculating the return for all possible combinations of sizes and selecting the combination which provides the greatest return. However, when the problem is complicated by a larger number of cutting lengths and prices, or when the material is two or three dimensional, this exhaustive technique is impractical.

A non-exhaustive technique that has been successfully employed for the stock cutting problem operates as follows for the preceding example—

*Step 1.*—Generate a first interim cutting pattern $n_i'$ by lexicographically ordering the total length by selecting the number $n_i'$ of lengths $l_i$ that fit into the total length, in the order of highest return per unit length. In the example, $n_1'=2$; $n_2'=0$; $n_3'=0$; $n_4'=1$; $n_5'=0$. That is, two 7-inch lengths and one 3-inch length are selected. The interim return R′ for the selected interim cutting pattern (2, 0, 0, 1, 0) is then calculated to equal \$2.00. The remainder L′ for this cutting pattern is calculated to equal zero. The interim cutting pattern $n_i$ is also stored as the best (only) cutting pattern that has been derived up to this point in the procedure and the interim return R′ is stored as the optimum return to this point in the procedure.

*Step 2.*—Tentatively decrement the last non-zero digit in the interim cutting pattern $n_i'$ by one, and tested for possible improvement by cutting the previous remainder L′ plus the length $l_p$ (provided by the decrement) into next lower-order lengths $l_{p+1}$, according to:

$$(L'+l_p)\cdot(p_{p+1})-(p_p)\cdot(l_{p+1})>(l_{p+1})\cdot\max\ (0,\ R-R')$$

The test is satisfied when the inequality is satisfied, where R is the greatest previously-calculated return, and where R′ is the return for the last-calculated pattern. (At this stage in the example $R'=R$ because only one cutting pattern has heretofore been determined.) In the example, the calculation provides:

$$(0+3)\cdot(.02)-(.20)\cdot(1)>(1)\cdot\max(0,2.00-2.00)$$

Since the left side of the expression does not exceed the right side, the test fails, indicating that no improvement is possible by deleting a 3″ length and replacing it with 1″ lengths. When the test fails, replace the lowest-order, non-zero number $n_p'$ with zero, calculate the return R′ for the resulting cutting pattern (\$1.80), and calculate the remainder $L'$ (3″).

*Step 3.*—When the test fails in step 2, repeat step 2 by tentatively decrementing the highest-order non-zero number $n_p'$ that remains after the deletion ($n_1'$ in the example) by one.

The test provides:

$$(3+7)(1.00)-(.90)(8)>(8)\max(0, 2.00-1.80)$$

Since \$2.80 exceeds \$1.60, the test is passed, indicating that there may exist a better cutting pattern than the original pattern (2, 0, 0, 1, 0). Should the test have failed, the cutting pattern (2, 0, 0, 1, 0) would have been known to be optimum as step 2 could not have been repeated because the deletion of the tested order ($n_1'$) would have resulted in all numbers $n_i'$ equal to zero. When the test is passed, the remainder L' is altered by the addition of $l_p$ (to provide 10" in the example).

*Step 4.*—When the test is passed (based on a decrement of the tested number $n_p'$ by one), the remainder $L'$ (10") is lexicographically ordered with higher-order lengths (lower return per unit length). In the example, a cutting pattern of (1, 1, 0, 0, 2) is obtained with a remainder $L'=0$. The return R' for this cutting pattern is calculated to equal \$1.94. Since this return is less than the largest previously-calculated return (\$2.00), R is not replaced by R' and $n_i$ is not replaced by the newly-calculated cutting pattern $n_i'$.

*Step 5.*—Repeat the test in steps 2 and 3 on the new cutting pattern (1, 1, 0, 0, 2). Since, in the example, the lowest-order non-zero number ($n_5'$) is in the lowest order of the cutting pattern, the test cannot be performed (fails) and $n_5'$ is replaced with "0" (giving a remainder $L'=2''$), R' is calculated (\$1.90), $n_2'$ is tentatively decremented by one (to "0"), and the test is again performed to give:

$$(2+8)(.40)-(1.00)(4)>(4)\max(0, 2.00-1.94)$$

Since the left side of the expression equals 0, the test is failed, so $n_2'$ is replaced with 0 and R' and L' are calculated for the new cutting pattern (1, 0, 0, 0, 0) to equal \$.90 and 10".

*Step 6.*—The test is repeated after tentatively decrementing the highest-order, non-zero number by one (in the example, $n_1'$ is changed from "1" to "0"). The test is passed as follows:

$$(10+7)(1.00)-(.90)(8)>(8)\max(0, 2.00-.90)$$

*Step 7.*—Since the last test is passed, step 4 is again performed. The last interim cutting pattern $n_i$ (1, 0, 0, 0, 0) is decremented by one in the tested order ($n_1'$) and the remainder is lexicographically ordered to provide an interim cutting pattern $n_i$ (0, 2, 0, 0, 1); and the return R' is calculated to be \$2.02. Since R' exceeds R (2.00), R is replaced by R' and the best cutting pattern $n_i$ (2, 0, 0, 1, 0) that was stored in step 1 is replaced with the higher-return pattern (0, 2, 0, 0, 1).

*Step 8.*—The test in steps 2 and 3 is repeated. Since the test canot be performed (fails) for $n_5'$, $n_5'$ is replaced by "0," $L'=1''$, and R' is calculated to be \$2.00. The test is again repeated, tentatively decrementing $n_2'$ by one (to "1"):

$$(1+8)(.40)-(1.00)(4)>(4)\max(0, 2.02-2.00)$$

The left sides of the expression is negative so the test is failed and $n_2$ is replaced by "0." This provides a cutting pattern of (0, 0, 0, 0, 0), indicating that the process is finished. The optimum cutting pattern $n_i$ (0, 2, 0, 0, 1) corresponding to the highest return R (\$2.02) is then the result.

The above example illustrates one problem in the large class of problems which require: the calculation of interim results ($n_i'$, R', L') on input data ($l_i$ and $p_i$); an analysis of the structure of these results; and alterations of the interim results according to a predetermined algorithm (tentatively decrementing testing, decrementing or replacing with "0," etc.); and further calculations on that input data which is selected on the basis of the interim results. Problems of this type are not efficiently performable in traditional general purpose computers because these computers are limited to serial operations on data stored in bulk memories and, hence, require a tremendous number of memory access cycles for relatively little computation.

In the inventive machine organization, input data ($l_i$, $p_i$) is selected by an operand control circuit and calculations are performed by an arithmetic unit to provide interim results ($n'$, R', L'). The structure of the interim results then influences the operand control circuits to select the appropriate input data ($l_i$, $p_i$) for the subsequent step in the calculation. Optimum result storage ($n$, R) is also provided to retain the best results that have been developed during the operation of the system such that, when the iteration is terminated, the best solution ($n_i$) to the problem is available.

Accordingly, it is an object of the present invention to provide a computer wherein the data selection for subsequent calculations is controlled by the results of previous calculations.

Another object is to provide a computer having simultaneously-addressable input data storage where the data selection is dependent upon the results of previous arithmetic operations.

A further object is to provide a computer for performing a lexicographic ordering operation on applied data.

A further object is to provide a computer for iteratively performing operations on applied data to develop results which are tested to determine which data, if operated on during subsequent iterations, is capable of contributing to the results.

Another object is to provide a computer wherein the structure of the results of calculations are analyzed to alter the results under predetermined conditions and to control the selection of input data for subsequent calculations.

A further object is to provide a computer whose arithmetic operations are selected by the results of previous calculations.

A still further object is to provide a computer having interim result storage and optimum result storage, wherein data is transferred from the interim result storage to the optimum result storage under predetermined conditions during the operation of the computer.

A still further object is to provide a computer wherein the structure of the results derived from earlier calculations controls the selection of data for subsequent calculations.

The foregoing and other objects, features, and advantages of the invention will be apparent from the following more particular description of a preferred embodiment of the invention, as illustrated in the accompanying drawings.

*Description of preferred embodiment*

Figure 1:
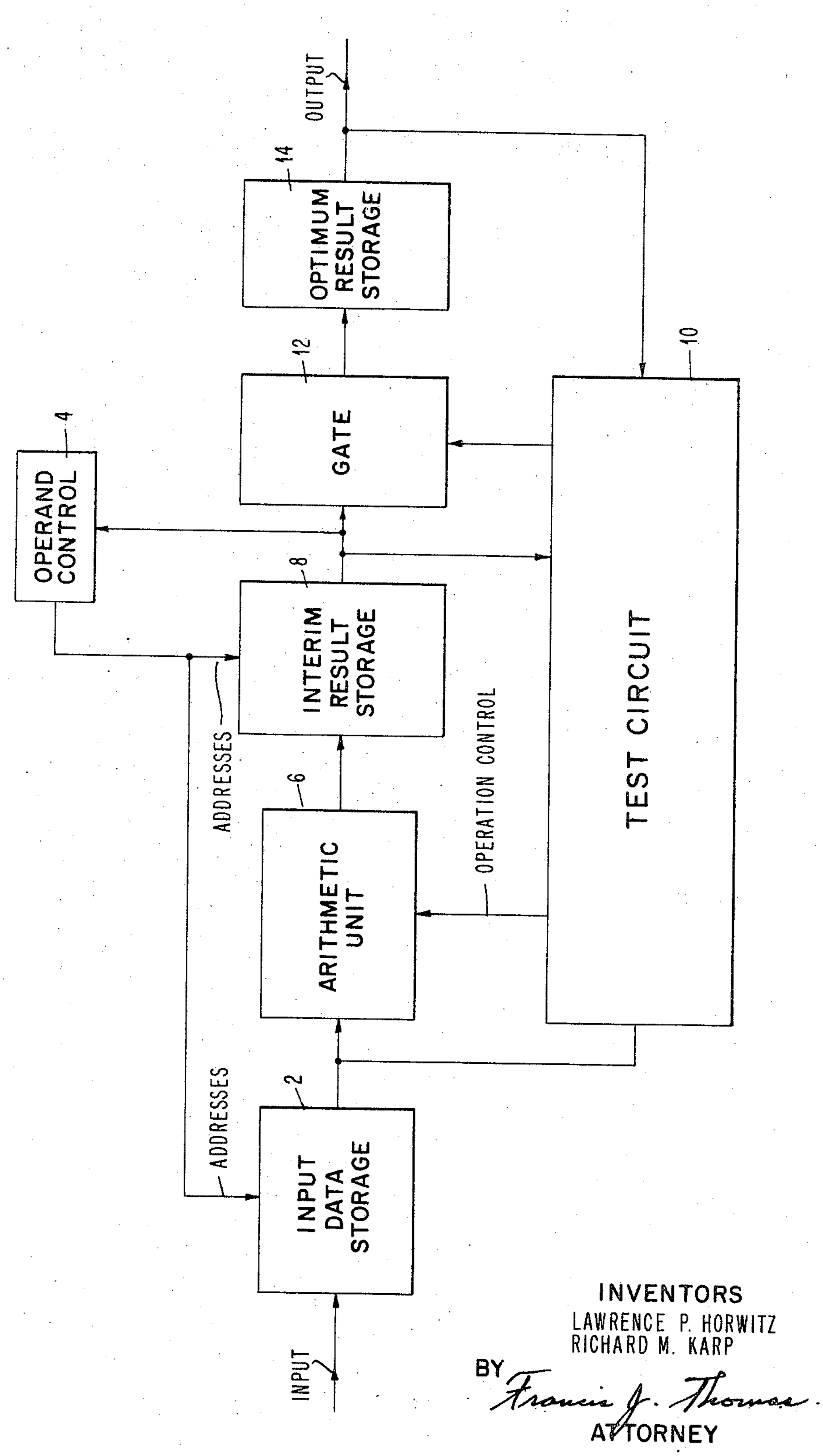
FIGURE 1 is a block diagram of a preferred embodiment of the inventive machine organization.

In the block diagram of FIGURE 1, input data is applied to storage circuit 2. An operand control circuit 4 addresses (selects) certain of the input data for application to an arithmetic unit 6 which provides results that are stored in an interim result storage circuit 8. The operation of the arithmetic unit is controlled by a signal from a test circuit 10, to be described below. The operand control circuit 4 receives the data stored in the interim result storage circuit 8 and, from an analysis of this data, determines the subsequent address to be used in selecting data from the input data storage circuit. The operand control circuit also addresses the interim result storage circuit to select data for application to a gate 12 which, when conditoined by a signal from the test circuit 10, passes the data to an optimum result storage circuit 14, from which the system output is derived. The test circuit 10 receives data from the input data storage circuit 2, the interim result storage circuit 8, and the optimum result storage circuit 14, and provides control signals to the arithmetic unit 6 and to the gate 12. As described above with respect to the illustrative stock cutting example, a "test for possible improvement" is made under certain circumstances and the result of this test controls the lexicographic ordering and other processes performed by the arithmetic unit. The test circuit 10 performs this test to provide the "operation control" signal for the arithmetic unit 6. The test circuit 10 also performs the "test for actual improvement" that is described in the illustrative example and the result of this test controls the gating of data from the interim result storage circuit 8 to the optimum result storage circuit 14.

The operation of the system shown in FIGURE 1 is to be described in detail with respect to the illustrative stock cutting problem that is described above and is shown graphically in FIGURE 2. The first operation that is performed upon the applied data is a lexicographic ordering as indicated in block 22 in FIGURE 2. This is described in the illustrative example in step 1 where a first interim cutting pattern $n_i'$ is derived for a total length L′ by dividing this length into $n_i'$ pieces of length $l_i$. Referring to FIGURE 1, the input data storage circuit 2 contains the lengths $l_i$ and the operand control circuit 4 sequentially selects these lengths for application to the arithmetic unit 6 which generates the interim cutting pattern $n_i'$ for storage in the interim result storage circuit 8. As specified in step 1 of the example above, the return R′ for this selected interim cutting pattern is also calculated. This calculation is also performed by the arithmetic unit 6 and is based on the applied prices $p_i$ that are contained in the input data storage circuit 2 and the interim cutting pattern $n_i'$ that is contained in the interim result storage circuit 8. The calculated return R′ is then stored in the interim result storage circuit. As illustrated in step 1 in the above illustrative example, the remainder L′ for the interim cutting pattern $n_i'$ is also calculated. The arithmetic unit 6 performs this operation and the result is applied to the interim result storage circuit 8.

Returning to FIGURE 2, the next step (block 24) in the stockcutting problem involves a determination of whether the calculated return R′ exceeds the optimum return R. Since, at this stage in the problem, R′ is the only return that has been calculated, it represents the optimum return, so a "yes" signal from block 24 causes the interim cutting pattern $n_i'$ to be stored as the optimum cutting pattern $n_i$ (block 26). In FIGURE 1, this determination is performed in the test circuit 10 by a comparison of the calculated return R′ (supplied by the interim result storage circuit 8) and the optimum return R (provided by the optimum result storage circuit 14). During this first step in the problem the calculated return R′ exceeds the optimum return R (as R equals zero) and the test circuit provides a signal to condition gate 12 which passes the interim cutting pattern $n_i'$ to the optimum result storage circuit 14 where it is stored as $n_i$. As indicated in block 26 in FIGURE 2, the calculated return R′ is also stored. The gate 12 in FIGURE 1 passes R′ to the optimum result storage circuit 14 for use by the test circuit 10 in subsequent comparisons with interim returns R′ that are calculated in later steps in the solution of the problem.

Figure 2:
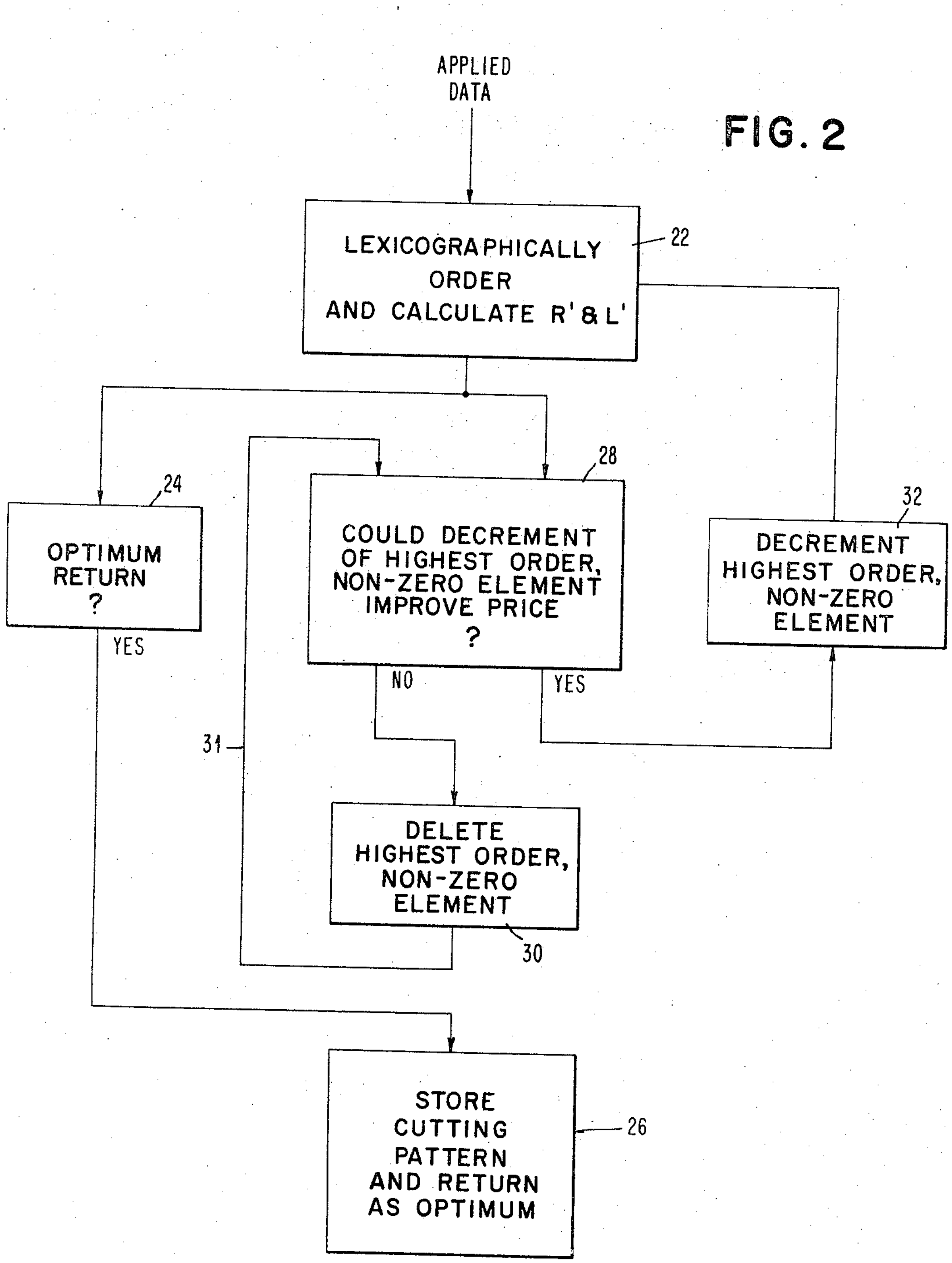
FIGURE 2 is a diagram illustrating the operations performed by the machine organization of FIGURE 1 while solving a stock cutting problem.

As shown in step 2 in the ilustrative example and by block 28 in FIGURE 2, the next operation is a test for possible improvement by tentatively decrementing the highest-order, non-zero element of the interim cutting pattern $n_i'$ by 1 (where the highest-order element corresponds to the smallest return per unit length). This test is accomplished in the test circuit 10 in FIGURE 1, and is based on the inequality that is described in step 2 of the illustrative example:

$$(L'+l_p)\cdot(p_{p+1})-(p_p)\cdot(l_{p+1})>(l_{p+1})\cdot\max(0, R-R')$$

When the test fails indicating that an improved price cannot be provided by decrementing the highest-order, non-zero element of the interim cutting pattern, the element is replaced by zero and the test is repeated on the next-lower order non-zero element of the interim cutting pattern. This operation is illustrated in FIGURE 2 by the "delete highest order" block 30 and path 31 which indicates a repetition of the test described in block 28. In FIGURE 1, the failure of this test causes an operation control signal to be supplied to the arithmetic unit 6 which, in turn, alters the interim cutting pattern stored in circuit 8.

When the "test for possible improvement" is passed, the highest-order, non-zero element of the interim cutting pattern is decremented by one (as indicated by block 32 in FIGURE 2) and the increased remainder L′ is lexicographically ordered amongst the higher-order lengths (as indicated by block 22 in FIGURE 2). This operation is described in step 4 of the illustrative example. In FIGURE 1, this partial lexicographic ordering is performed by the arithmetic unit 6 by operating on the input data in storage circuit 2 that is selected by the operand control circuit 4. At this time, a new return R′ and remainder L′ corresponding to the newly-derived interim cutting pattern $n_i'$ are also calculated in the arithmetic unit 6. Return to block 24 in FIGURE 2, if the new return R′ exceeds the optimum return R, the newly-calculated cutting pattern $n_i'$ and return R′ are stored as optimum. In FIGURE 1, gate 12 passes $n_i'$ and R′ from the interim result storage circuit 8 to the optimum result storage circuit 14.

This operation is continued as described above until the failure of a "test for possible improvement" (block 28 in FIGURE 2) results in a deletion (block 30 of FIGURE 2) of all data in the interim cutting pattern, as illustrated in step 8 of the example. At this time, the operation of the system is completed and the optimum cutting pattern is supplied as the output of the system.

Figure 3:
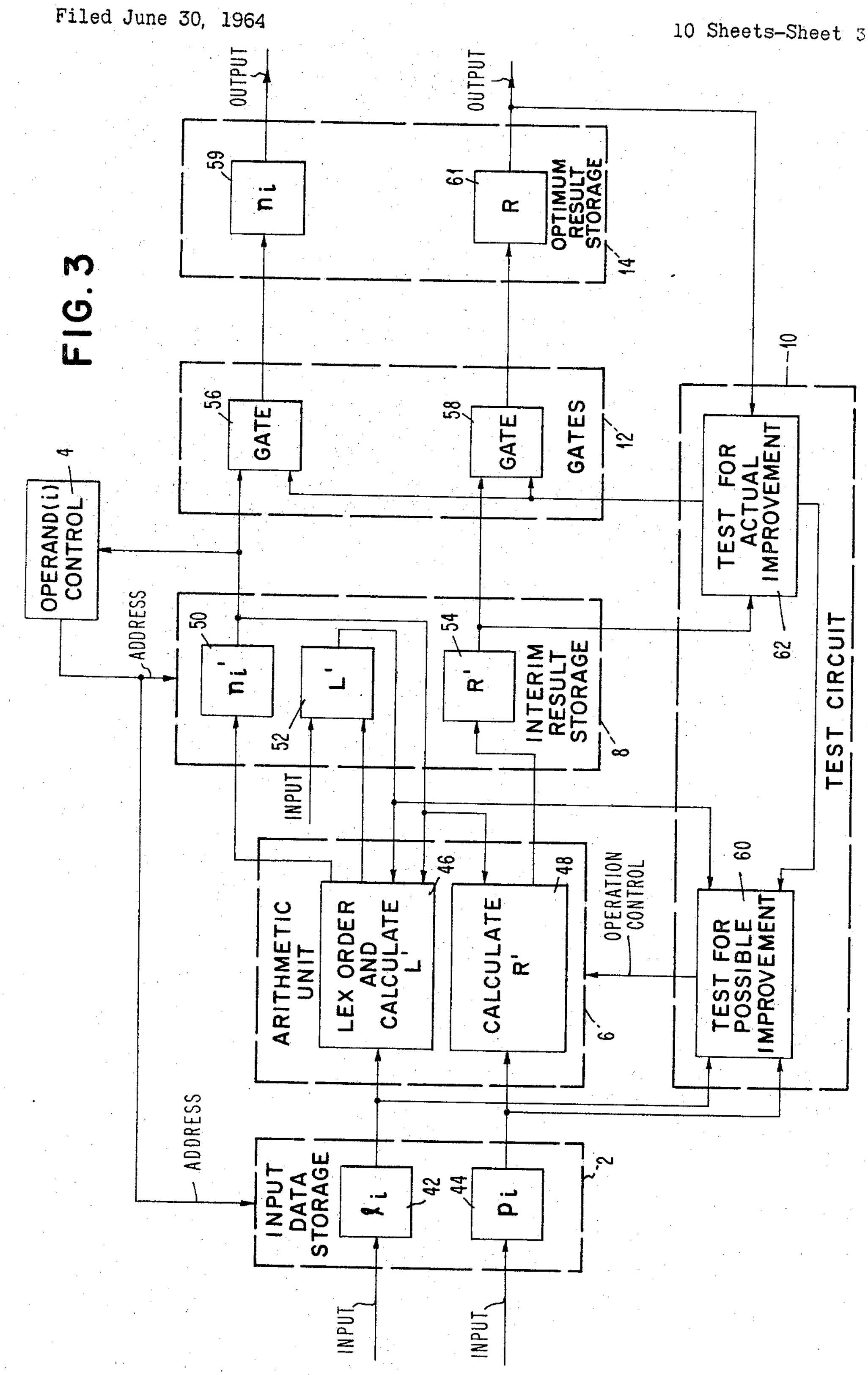
FIGURE 3 is an expanded block diagram of the preferred embodiment of the invention.

FIGURE 3 is an expanded block diagram of the preferred embodiment of the invention that is shown in FIGURE 1. The lengths $l_i$ and prices $p_i$ are stored in addressable memory sections 42 and 44 of the input data storage circuit 2. The arithmetic unit 6 responds to data supplied by the input data storage circuit 2 and interim data storage circuit 8 and performs several functions as described above. A first arithmetic sub-unit 46 operates on the length $l_i$ data, the interim cutting pattern data $n_i'$, and the remainder L′ data to calculate revised (interim) cutting patterns $n_i'$ (decrementing, deleting and lexicographic ordering) and to calculate revised remainders L′. A second arithmetic sub-unit 48 operates on the price $p_i$ data and the interim cutting pattern $n_i'$ data to calculate revised (interim) returns R′. The operation of sub-units 46 and 48 in the arithmetic unit 6 is under the control of the operation control signal from the test circuit 10 as described above. The results ($n_i'$, L′ and R′) of the calculations performed by the arithmetic unit are supplied to storage sections 50, 52 and 54, respectively, in the interim storage circuit 8. The L' storage section 52 also contains an input path upon which the total length L to be cut is applied before the calculations are initiated.

The interim cutting pattern $n_i'$ data is applied to the operand control circuit 4 to supervise the addressing of the input data storage circuit 2 and the interim result storage circuit 8. That is, the appropriate $l_i$, $p_i$, and $n_i'$ data is selected by the operand control circuit 4. The gate circuit 12 contains two sub-units 56 and 58 which pass the interim cutting pattern $n_i'$ and interim return R' data to sub-units 59 and 61, respectively, of the optimum result storage circuit 14 when conditioned by the test circuit 10.

The test circuit 10 performs two functions as described above: the "test for possible improvement" is performed in sub-unit 60 to provide the operation control signal for arithmetic unit 6; and the "test for actual improvement" is performed in sub-unit 62 to provide the conditioning signal for gates 12.

As described above, the arithmetic unit 6 performs several functions: decrementing, deleting, and lexicographically ordering the interim cutting pattern $n_i'$; and calculating revised remainders L' and returns R'. After the original lexicographic ordering operation (step 1 in the illustrative example), the operation control signal from the "test for possible improvement" sub-unit of the test circuit 10 controls the decrementing and deletion of cutting pattern $n_i'$ data elements and the point from which partial lexicographic ordering operation begins. Each alteration of the cutting pattern $n_i'$ also result in revised calculations of the remainder L' and return R'. These calculations are only performed if a test indicates that improvement is possible to avoid the necessity of "trying" every possible cutting pattern. Thus, the return provided by many of the possible cutting patterns (those for which the test indicates that no improvement is possible) are not calculated.

The "test for possible improvement" sub-unit 60 controls the arithmetic unit 6 and is responsive to the interim cutting pattern $n_i'$, the input lengths $l_i$, the input prices $p_i$, and a signal from the "test for actual improvement" sub-unit 62 corresponding to the difference between the optimum return R and the interim return R'. The "test for actual improvement" circuit 62 is responsive to the optimum result R and the interim result R' and, in addition to supplying a signal to the "test for possible improvement" sub-unit 60, this circuit provides the conditioning signal for gates 12 when the interim return exceeds the optimum return. The functional operation of both test sub-units 60 and 62 has been described above, and the circuits which perform the test will be described in detail below.

Figure 4A:
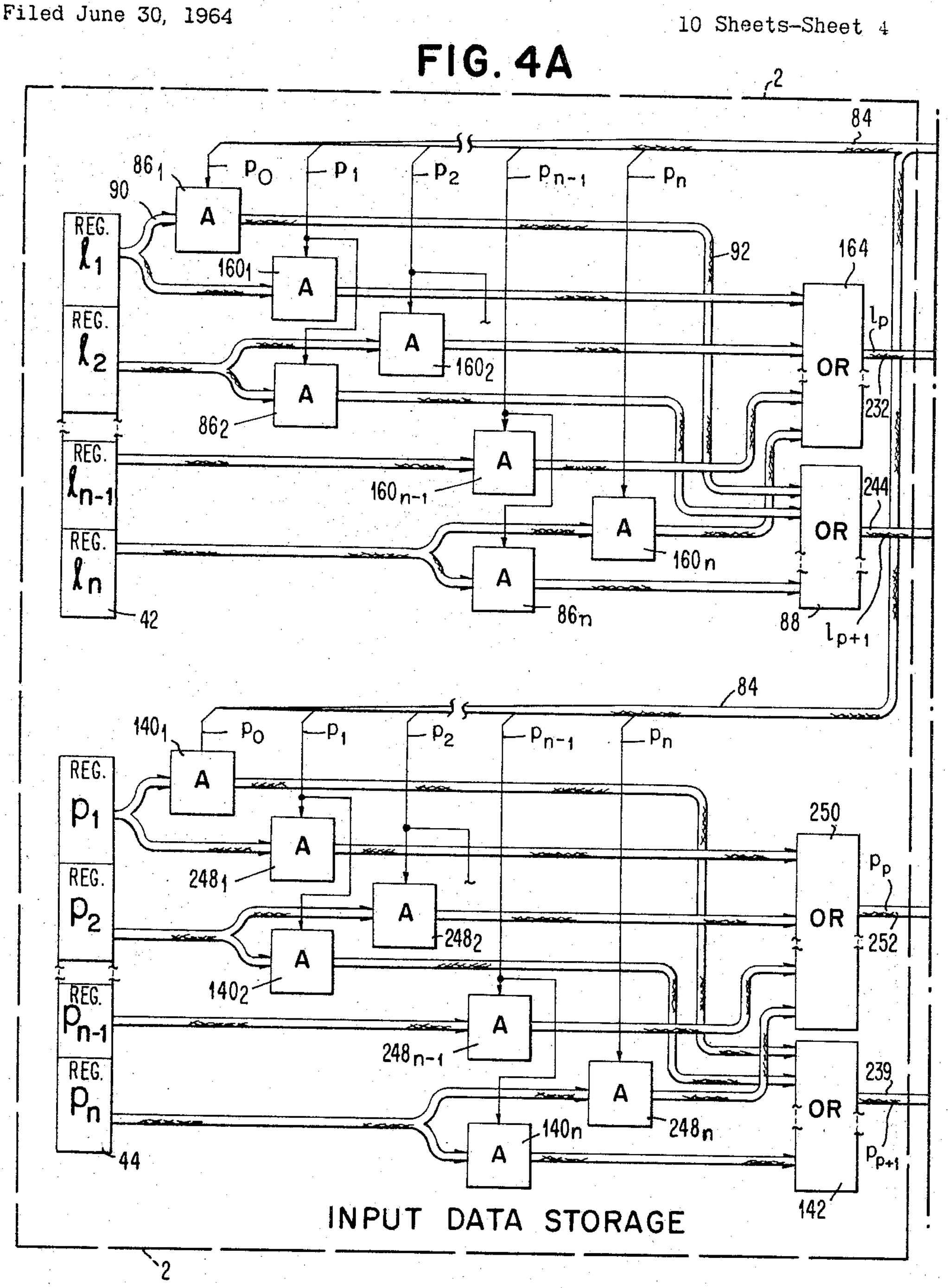
FIGS. 4A to 4E (when connected in the manner indicated by FIG. 4) illustrate the circuitry of the preferred machine organization.
Figure 4:
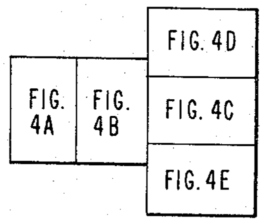
FIG. 4 is a diagram illustrating the manner in which FIGS. 4A to 4E may be connected together to provide a complete circuit diagram.

The preferred embodiment of the invention has been described with respect to the block diagrams in FIGURES 1, 2, and 3 and is to be described in detail with respect to FIGURE 4. The operation of the detailed circuits shown in FIGURE 4 are also to be described with respect to the illustrative stock cutting example.

Figure 5:
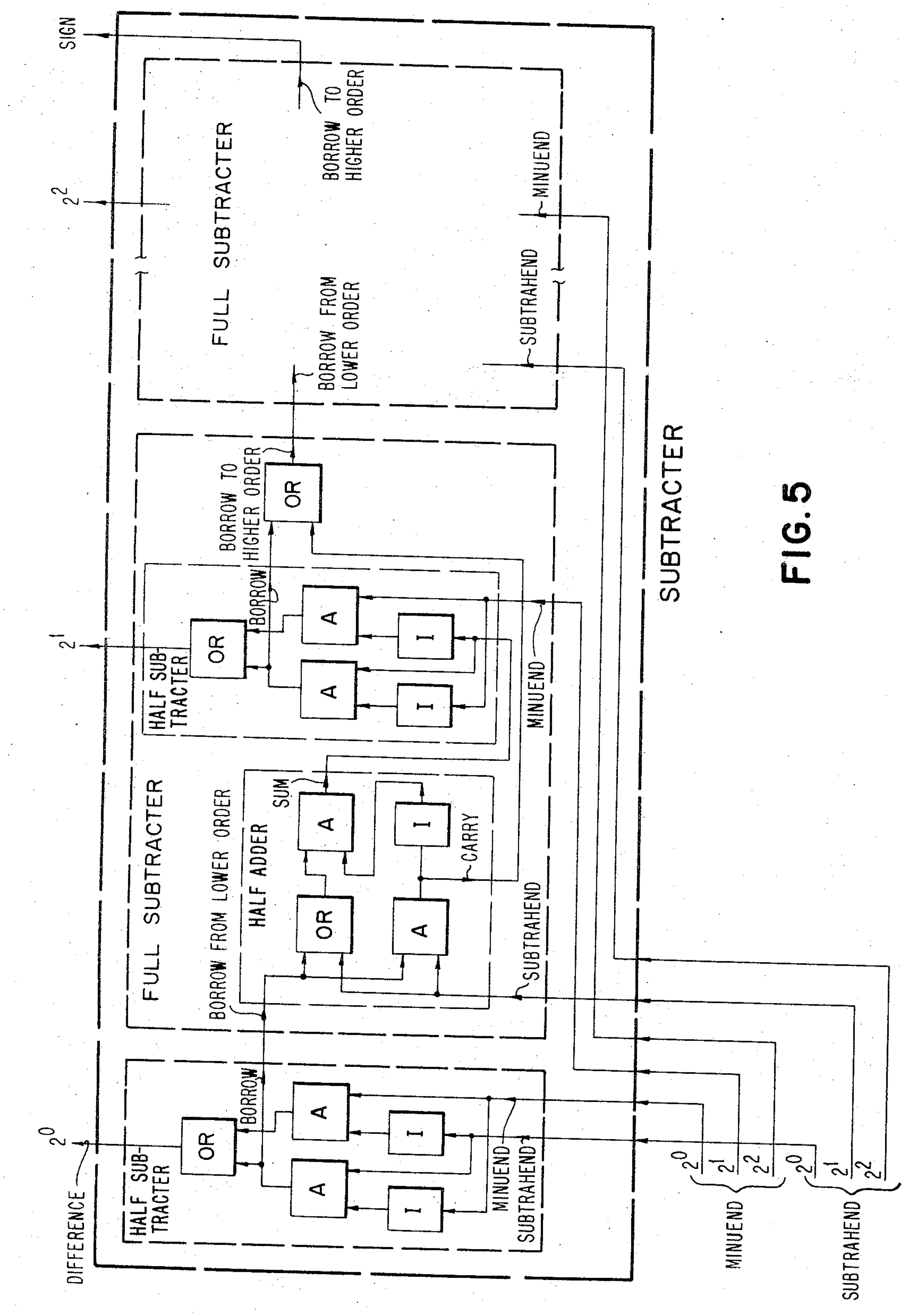
FIGURE 5 is a detailed diagram of a subtracter that is suitable for use in the embodiment of FIGURES 4A–4E.
Figure 6:
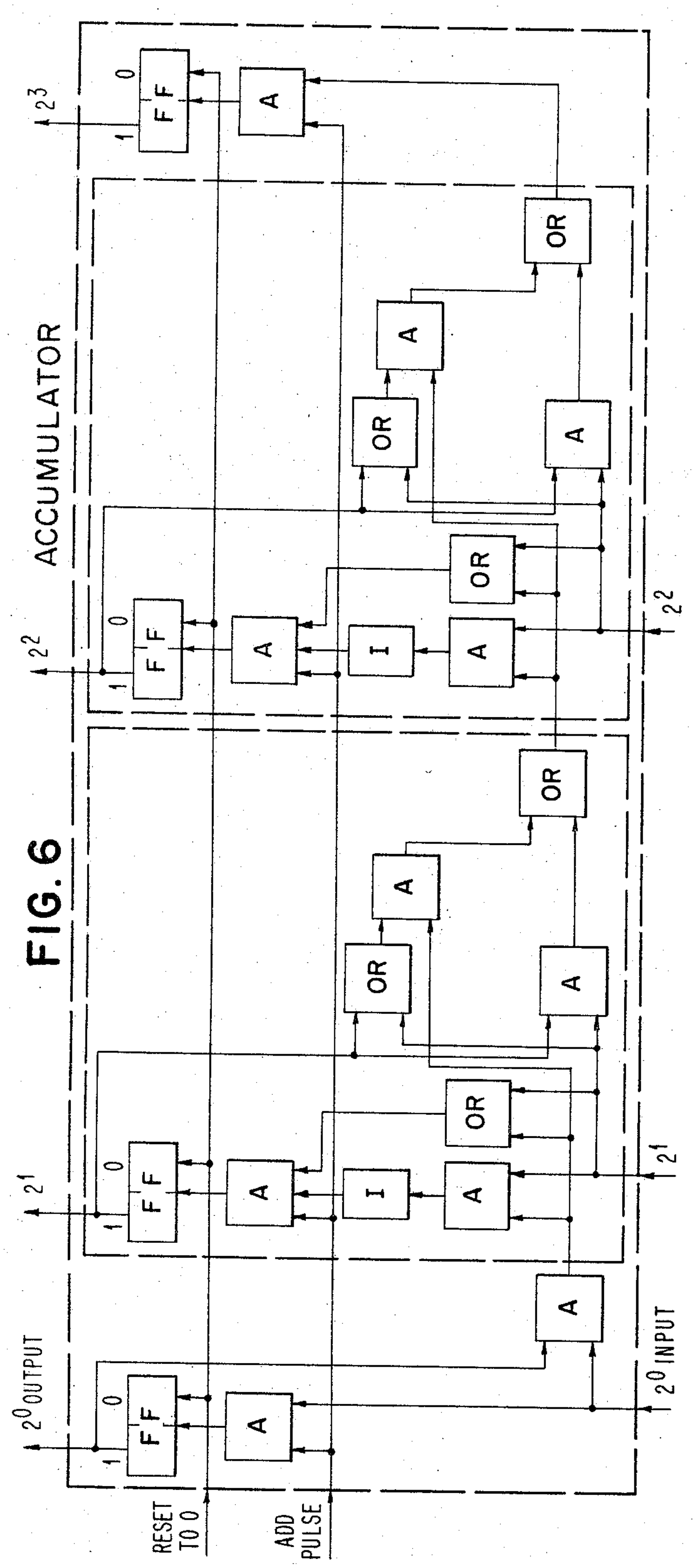
FIGURE 6 is a detailed diagram of an accumulator that is suitable for use in the embodiment of FIGURES 4A–4E.
Figure 7:
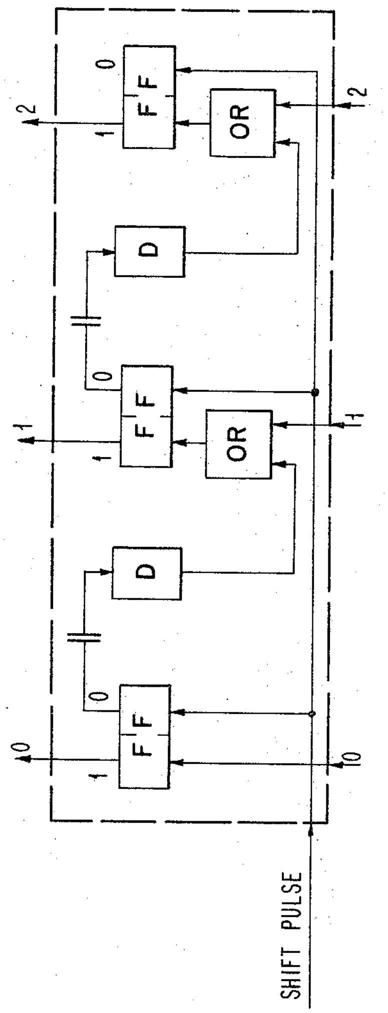
FIGURE 7 is a detailed diagram of a ring counter that is suitable for use in the embodiment of FIGURES 4A–4E.

Although most of the circuits that are used in FIG. 4 are conventional, a subtractor, an accumulator and a ring counter are shown in detail in FIGS. 5, 6 and 7.

The subtractor shown in FIG. 5 is similar to the subtractor shown in a text by R. K. Richards, entitled, Arithmetic Operations in Digital Computers, 1955, published by Van Nostrand. The half-subtractors shown in FIG. 5 follow the binary subtraction table 4–III on page 115 of the reference. The half adder is identical to the circuit in FIG. 4–3(*c*) on page 86 of the reference. FIGURE 5 shows only two stages of the subtractor in detail. The third stage is shown as a block which includes all of the circuits in the second stage. Since the binary subtractor output indication for a negative difference is in complement form, the borrow from the highest order full subtractor indicates the sign of the difference—a "1" indicates a negative difference and a "0" indicates a positive difference.

An accumulator is shown in detail in FIGURE 6. This accumulator is of the type shown on FIG. 4–22 at page 110 of the previously-cited Richards' text. A reset input is applied to each flip-flop in the accumulator. The binary word to be accumulated and an "add" pulse are applied simultaneously to cause the binary word to be added to the previously-stored sum.

A ring counter is shown in detail in FIGURE 7. Only one flip-flop of this counter is set at any time. At each application of a shift pulse, the flip-flop that was previously set in reset and, after a delay, the adjacent, higher-order flip-flop is set. Reset inputs are provided to set the circuit to any desired stage of operation. A more detailed description of the operation of a ring counter is found in the previously-cited Richards' text.

Referring to FIGURE 4, before initiating the operation of the system, the various circuits are reset as follows: the optimum result storage circuit 14 (FIGURE 4C) is reset (the optimum cutting pattern $n_i'$, $n_2$ . . . $n_{n-1}$, $n_n$ registers 59 and the optimum return R register 61 contain 0 values); the interim result storage circuit 8 (FIGURE 4C) is reset (the interim cutting pattern $n_i'$, $n_2'$ . . . $n_{n-1}'$, $n_n'$ counters 50 are reset to 0, the interim return R' accumulator 54 contains a 0 value, and the remainder L' register 52 is set to a value equal to the length of the material to be cut which, in the illustrative example, equals 17). In addition, the operand control circuit 4 (FIGURE 4D) contains a ring counter circuit 82 which is set to provide an output from the $P_0$ stage. The input data storage circuit 2 (FIGURE 4A) contains lengths $l_1$, $l_2$ . . . $l_{n-1}$, $l_n$ in a group of registers 42 and prices $p_1$, $p_2$ . . . $p_{n-1}$, $p_n$ in a group of registers 44 which are preset in accordance with the problem to be solved. In the illustrative example, $l_1=7$, $l_2=8$, $l_3=4$, $l_4=3$, and $l_5=1$, $p_1=.90$, $p_2=1.00$, $p_3=.40$, $p_4=.20$, and $p_5=.02$. In this example, there are five possible lengths among which the material is to be cut and, hence, there are five length registers 42 FIG. 4A and price registers 44, and the cutting pattern counters 50 (FIG. 4C) and degisters 59 are each capable of storing five numbers. Similarly, the final element of the ring counter 82 (FIG. 4D) in the operand control circuit 4 is $p_5$. Thus, the subscript $n$ (as in $l_n$, $p_n$, $n'_n$, etc.) equals 5 for the illustrative example and the subscript $i$ (as in $l_i$, $p_i$, $n'_i$, etc.) ranges from 1 to 5.

As described above in the illustrative example, the first step requires that the length L' (17) be lexicographically ordered among the lengths $l_i$, which lengths have been arranged in the order of highest return per unit length (even though length $l_2$ corresponds to a higher price than $l_1$, it follows $l_1$ in the sequence because $l_1$ provides a greater return per unit length). The lexicographical ordering operation provides the first interim cutting pattern $n_i'$ for storage in counters 50 (FIG. 4C) in the following manner. Initially, ring counter 82 in the operand control circuit 4 (FIG. 4D) provides a $P_0$ output which is applied on a cable 84 to condition an AND gate 86$_1$ in the input data storage circuit 2 (FIG. 4A). This AND gate passes data indicative of length $l_1$ (7, in the example) to an OR gate 88. Since the system operates on binary digital data, the length $l_1$ is shown to be transmitted by way of a cable 90 to AND gate 86$_1$, rather than by way of a single wire. In the example, the cable contains four wires and the length 7 is represented in the binary number system as 0111. Accordingly, AND gate 86$_1$ comprises four separate AND gates, each conditioned by the $P_0$ signal which, when conditioned, pass the data applied on cable 90 through output cable 92 to OR gate 88. Throughout the detailed embodiment of FIGURE 4, a single block is used to show various logic circuits with cable-designated input and output signal paths. Each of the circuits that are so designated contain several distinct and independently operating logic circuits.

Figure 4B:
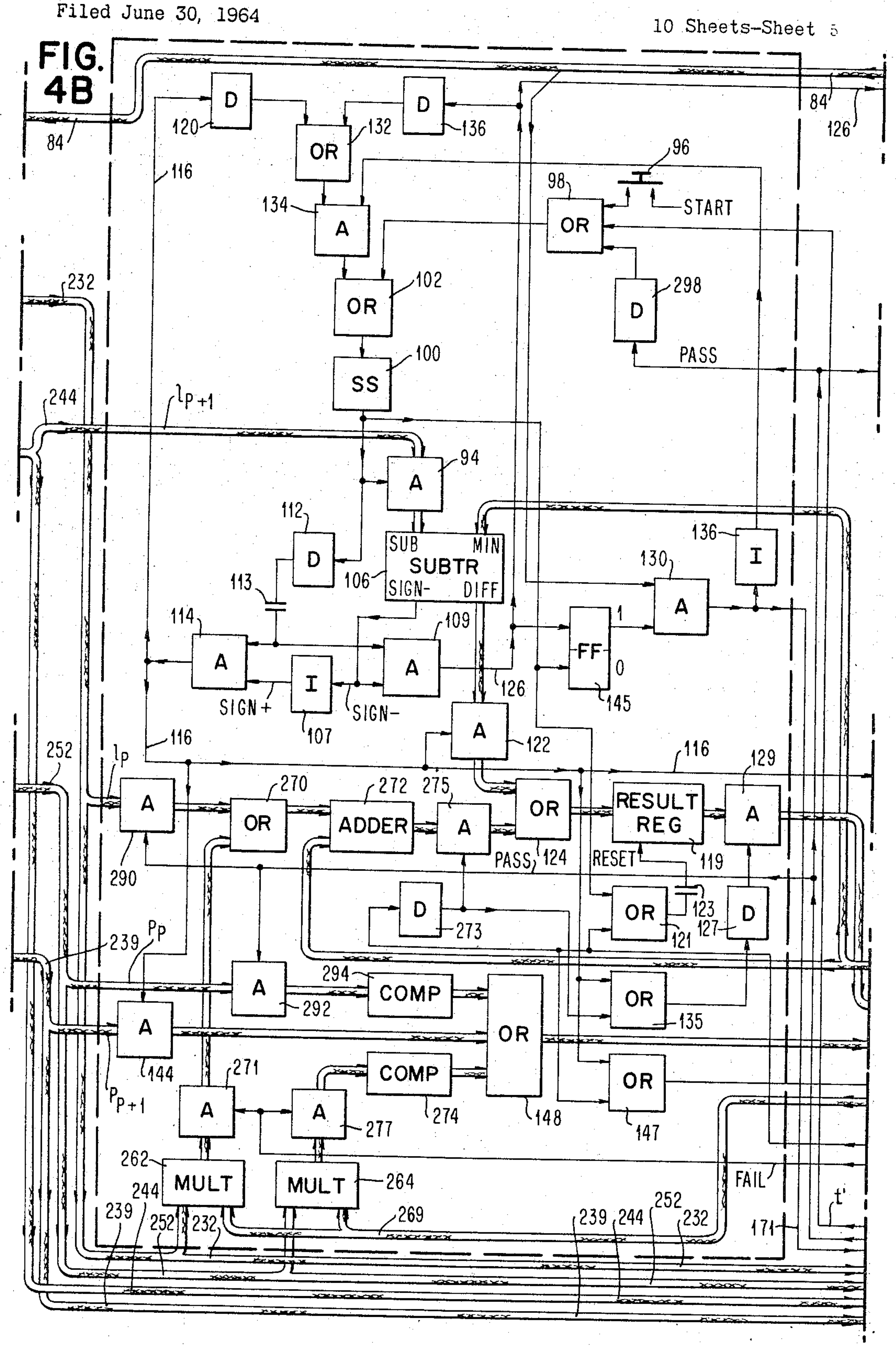

The length $l_1$ which is passed by OR gate 88 is applied to an AND gate 94 in FIGURE 4B. The conditioning signal for the AND gate is originated by a start switch 96 in FIGURE 4B which, when closed, causes a signal to be applied through OR gates 98 and 102 to trigger a single-shot pulse generator 100. The pulse generator provides a signal to condition AND gate 94 which passes the $l_1$ data as the subtrahend of a subtractor 106. The total length (17, in the example) is applied as to the minuend to the subtractor from the L′ register 52 in FIGURE 4C. The difference $(L'-l_1)$ is provided by the subtractor and is applied to an AND gate 122. The subtractor also produces a signal at its "sign-" output when the sign of the difference is negative. Since L′ (17) is larger than $l_1$ (7), the sign of the difference is positive, and no signal is present on the "sign-" output of the subtractor.

Figure 4C:
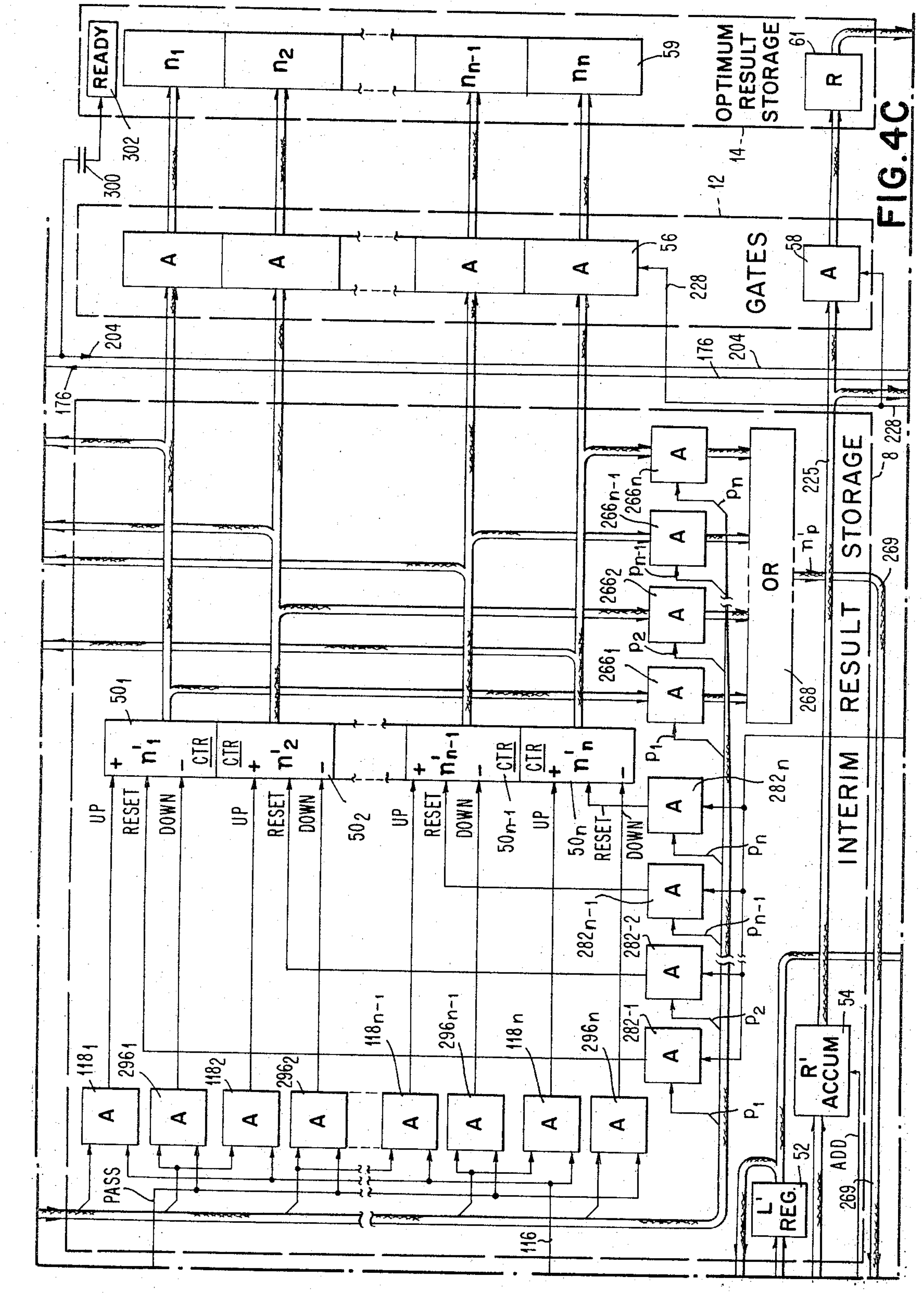

The pulse from single-shot 100 is applied through a delay 112 and the leading edge of this pulse is passed by a capacitor 113 to an AND gate 114. Since the subtractor 106 produces no "sign-" signal to the inverter 107, the inverter develops a signal to condition AND gate 114. Thus AND gate 114 passes the signal from capacitor 113. The delay 112 insures that the subtractor has sufficient time to develop its outputs before the operation of the subsequent circuits its initiated. The signal that is generated by AND gate 114 is applied on a lead 116 to condition several AND gates 118 (including $118_1$, $118_2$ . . . $118_n$) in FIG. 4C. The $P_0$ signal from the operand control circuit 4 (FIG. 4D) is also applied to AND gate $118_1$, so the signal from AND gate 114 (FIG. 4C) causes an UP signal to be applied to the $n_1'$ interim cutting pattern counter $50_1$. Each counter 50 (including $50_1$, $50_2$ . . . $50'_n$) is initially reset to 0 and is incremented by 1 when a signal is applied on its UP input and decremented by 1 when a signal is applied on its DOWN input. Thus, the $n_1'$ interim cutting pattern counter $50_1$ contains, at this step in its operation, a count of 1 indicating that length $l_1$ has been successfully subtracted from total length L′ without providing a negative difference. The pulse from single-shot 100 is applied through an OR gate 121 to a capacitor 123 which forms the leading edge of the pulse to reset a result register 119. The output of AND gate 114 is also applied to condition a multiple AND gate 122 which passes the difference data from subtractor 106 through an OR gate 124 to the result register 119. The signal from AND gate 114 is also applied on lead 116 through an OR gate 125 and a delay 127 to condition an AND gate 129. This AND gate passes the contents of the result signal 119 to the L′ register 52 (FIG. 4C). This transfer of data employs two conductors per bit of data to avoid the necessity of resetting register 52. The delay 127 insures that the result register has accepted its applied data before its contents are interrupted. In this manner, the successful subtraction of $l_1$ from L′ causes the new remainder length to be stored in register 52. In the illustrative example, 7 is subtracted from 17 to cause a difference of 10 to be stored in register 52. The output pulse of the single-shot 100 is sufficiently long in duration to condition AND gate 94 until the difference from the subtractor 106 is placed in the result register 119. The output of AND gate 114 (FIG. 4B) is also applied through a delay circuit 120 and an OR gate 132 to an AND gate 134 to start the second cycle of the initial lexicographic ordering operation (a second attempt to subtract $l_1$ from L′). The second input to AND gate 134 is provided by an inverter 136 at this time, as will be described below. The AND gate 134 passes the signal from OR gate 132 through OR gate 102 to again trigger single-shot 100 to initiate the second cycle of operation.

The second cycle of operation is identical to the first cycle and subtractor 106 (FIG. 4B) again produces a positive difference. A signal produced by AND gate 114 causes a second entry in the $n'_1$ interim cutting pattern counter $50_1$ (FIG. 4C). The output of subtractor 106 (FIG. 4B) is then placed in the L′ register 52 (FIG. 4C) as described above. (This register now contains the value 3, for the illustrative example.)

Figure 4D:
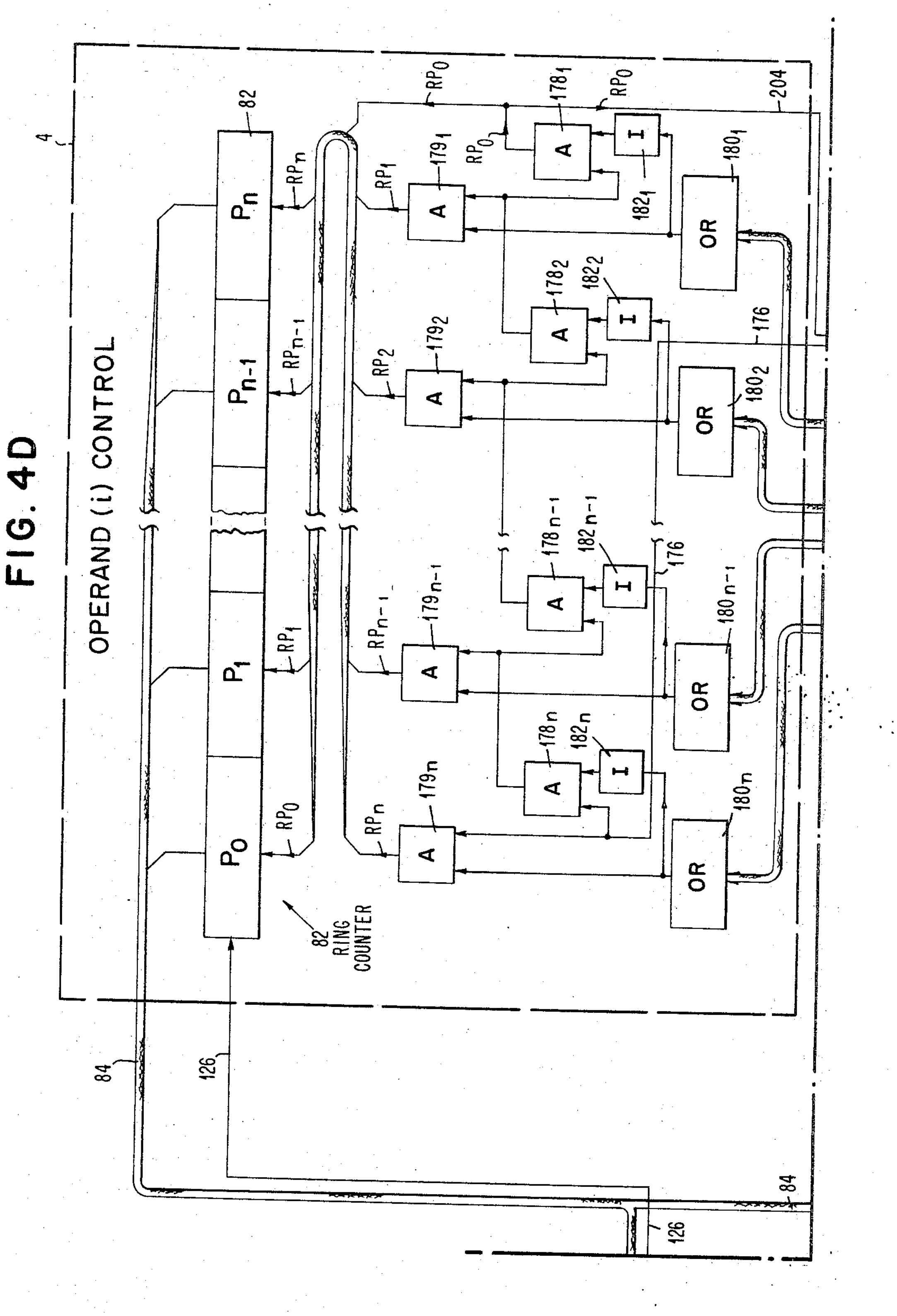

The cycle is repeated, but the third attempt to subtract length $l_1$ causes the subtractor 106 to produce a signal on its "sign-" output which removes the conditioning signal to AND gate 114 by the action of inverter 107. The "sign-" signal from subtractor 106 conditions an AND gate 109. The delayed leading edge of the pulse from single-shot 100 is then passed by AND gate 109 on a lead 126 to the operand control circuit 4 (FIG. 4D). This signal is applied to ring counter 82, causing its output signal to shift one position to the right. This removes the $P_0$ signal and places a signal on the $P_1$ output. Thus, the system has concluded the first phase of the initial lexicographic ordering process (with respect to the length $l_1$) and is prepared to lexicographically order the remainder L′ with lengths $l_2$ through $l_n$. The second phase of the lexicographic ordering process is initiated by the signal from AND gate 109 which is applied through a delay 136 and an OR gate 132 (FIG. 4B) to AND gate 134 which passes the signal as described above. Delay 136 insures that the ring counter 82 in the operand control circuit 4 (FIG. 4D) has sufficient time to shift to its $P_1$ section before the subsequent operations are performed.

Before proceeding with the second phase of the operation (with respect to the length $l_2$), the calculation of R′ for the first phase of the lexicographic ordering operation is to be considered. In the first phase, the operand control circuit 4 (FIG. 4D) provides the $P_0$ data select signal which is applied to an AND gate $140_1$ in FIG. 4A. This AND gate passes the price $p_1$ data through an OR gate 142 to an OR gate 142 to an AND gate 144 (FIG. 4B), which is conditioned by the signal from AND gate 114 each time that the length $l_1$ is successfully subtracted from the remainder L′. Thus, in the example, a signal is applied to AND gate 144 (FIG. 4B) twice, corresponding to the two times that length $l_1$ was successfully subtracted. The price $p_1$ data from AND gate 144 is applied throught an OR gate 148 to the interim return R′ accumulator 54 in FIG. 4C. The signal from AND gate 114 is also applied through an OR gate 147 as the "add" input to the accumulator. Thus, in the example, the price $p_1$ is twice added into accumulator 54 corresponding to the two times that length $l_1$ was successfully subtracted from remainder L′.

Returning to the second phase of the lexicographic ordering process, the operand control circuit 4 in FIG. 4D provides a data select signal on the $P_1$ output of ring counter 82. This $P_1$ signal conditions an AND gate $86_2$ in FIG. 4A to pass the length $l_2$ through OR gate 88 to the circuits in FIG. 4B. Simultaneously, the $P_1$ data select signal conditions an AND gate $140_2$ in FIG. 4A to pass the price $p_2$ data through OR gate 142 to the circuits in FIG. 4B. In the example, $l_2$ equals 8 and, at this stage in the operation, L′ equals 3. Thus, the attempted subtraction of $l_2$ from L′ provides a "sign -" signal from subtractor 106 causing: no data to be applied to the interim cutting pattern counters 50 (FIG. 4C); the L′ register 52 (FIG. 4C) to remain unaltered; and AND gate 144 (FIG. 4B) to remain blocked, passing no price data to interim return R′ accumulator 54 (FIG. 4C). The "sign -" signal from the subtractor also causes the ring counter 82 in the operand control circuit 4 (FIG. 4D) to be shifted to its $P_2$ position causes single shot 100 to be triggered to initiate the next phase of the lexicographical ordering process.

In the manner described above, the lexicographic ordering process is continued for all lengths $l_i$ and prices $p_i$ to generate an interim cutting pattern $n_i'$ in counters 50 (FIG. 4C), to generate an interim return R′ in accumulator 54 and to generate a remainder L′, if any, in register 52. In the illustrative example, a cutting pattern:

$$n_1'=2$$
$$n_2'=0$$
$$n_3'=0$$
$$n_4'=1$$
$$n_5'=0$$

is generated with a remainder L′ equal to 0 and on interim return R′ equal to $2.00.

The termination of the lexicographic ordering process is controlled by the $P_{n-1}$ data select signal. As described above, the $P_0$ data select signal selects the $l_1$ and $p_1$ data, the $P_1$ data select signal selects the $l_2$ and $p_2$ data, etc. Thus, the $P_{n-1}$ data select signal causes the $l_n$ and $p_n$ data to be selected. In the example, $n$ equals 5 and, thus, the $P_4$ data select signal causes the $l_5$ and $p_5$ data to be selected for the final phase of the lexicographic ordering process. In order to stop the operation of the arithmetic unit 6 (FIG. 4B), the $P_{n-1}$ signal is applied to an AND gate 130 causing an output signal to be provided when a "sign -" signal is also present (indicating that the last length $l_n$ has been subtracted a sufficient number of times to provide a negative difference from subtractor 106. Each "sign -" signal conditions 109 to form the delayed leading edge of the pulse from single-shot 100 to set a flip-flop 145 to its "1" state. Thus, the "1" output of the flip-flop conditions AND gate 130 when "sign -" signals are provided by subtractor 106. During the final phase of operation, the $P_{n-1}$ signal is also applied to AND gate 130 causing a signal to be applied to inverter 136 which, in turn, produces no output signal. Hence, AND gate 134 is blocked, inhibiting the recycling of the arithmetic unit. Flip-flop 145 is reset by the output of single shot 100.

Figure 4E:
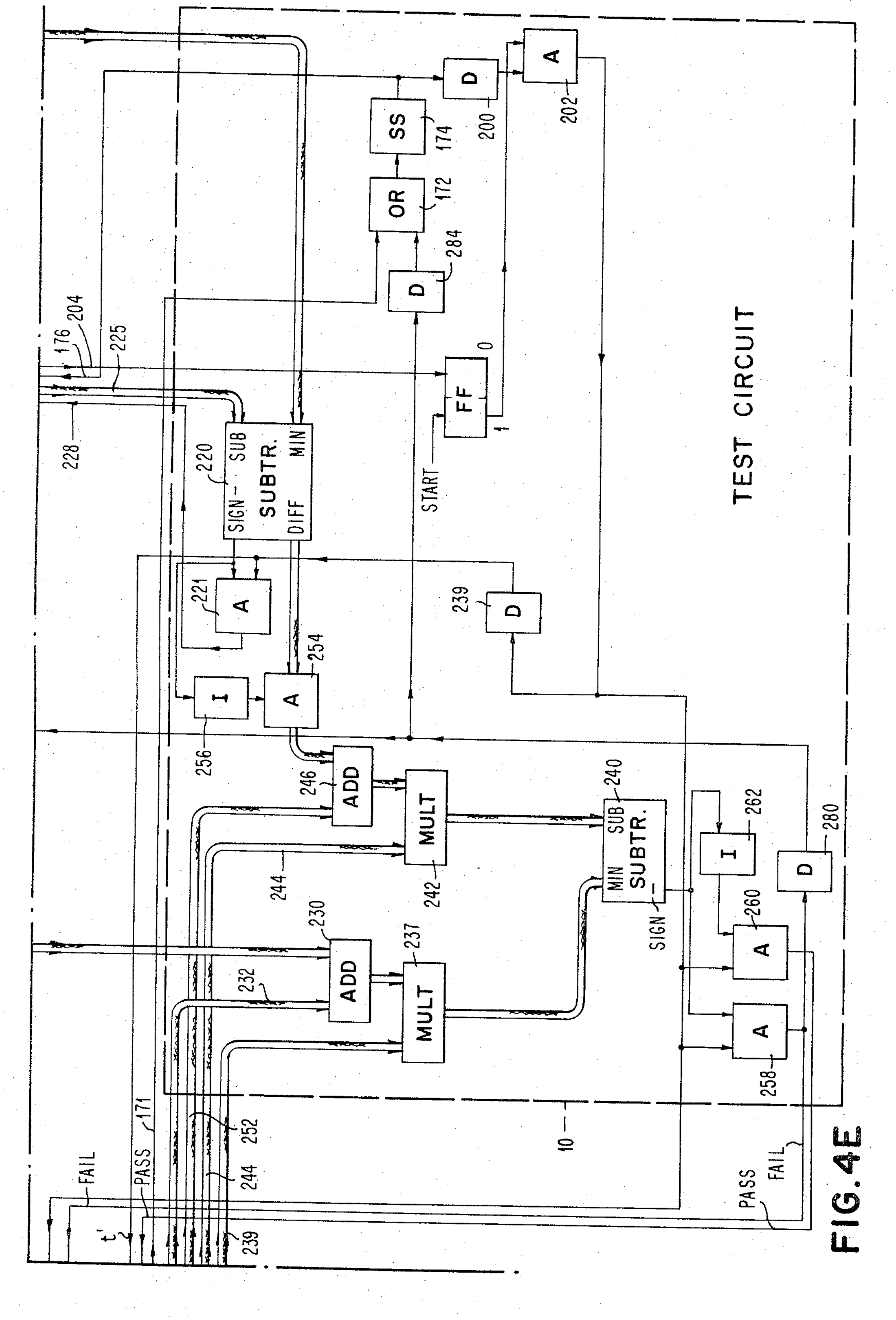

The output of AND gate 130 is also applied on a lead 171 to an OR gate 172 in the test circuit 10 in FIG. 4E. The signal produced by the OR gate triggers a single-shot 174 which provides a pulse that is applied on a lead 176 to AND gates 178 and 179 (including $178_1$, $178_2$ . . . $178_n$; $179_1$, $179_2$ . . . $179_n$) in the operand control circuit 4 in FIG. 4D. The interim cutting pattern $n_i'$ data that is stored in counters 50 (FIG. 4C) at the termination of the lexicographic ordering process is applied to OR gates 180 (including $180_1$, $180_2$ . . . $180_n$) in the operand control circuit 4. Each OR gate 180 produces a signal when its corresponding element of the interim cutting pattern $n_i'$ contains at least one non-zero data bit. The OR gates produce no signal when the associated cutting pattern element contains all zeros. The outputs of OR gates 180 are applied directly to AND gates 179 and through inverters 182 (including $182_1$, $182_2$ . . . $182_n$) to AND gates 178. Thus, AND gates 179 are conditioned when the corresponding cutting pattern $n_i'$ elements are non-zero and AND gates 178 are conditioned when the corresponding elements are zero. The timing signal on lead 176 (FIG. 4D) is applied to AND gates $178_n$ and $179_n$. When the interim cutting pattern contains non-zero data in the highest order $n_n'$, AND gate $179_n$ passes a signal labelled $RP_n$ to reset the ring counter 82 to the $P_n$ position. When the interim cutting pattern contains a 0 in the $n_n'$ position, AND gate $178_n$ passes the timing pulse on lead 176 to AND gates $178_{n-1}$ and $179_{n-1}$. In this manner the timing signal on lead 176 is propagated through the circuits in the operand control circuit 4 starting from the highest order toward the lowest order until the AND gate 179 corresponding to the highest order, non-zero element of the cutting pattern passes the timing signal to reset ring counter 82 to the corresponding stage.

The pulse generated by single-shot 174 (FIG. 4E) is also applied through a delay circuit 200 to an AND gate 202. The delay circuit 200 insures that the operand control circuit 4 (FIG. 4D) is stabilized before the test circuits 10 (FIG. 4E) are initiated. The $RP_0$ signal from the operand control circuit 4 (FIG. 4D) is applied on a lead 204 to a flip-flop 206 in the timing circuit 170 (FIG. 4E). The flip-flop is originally reset by the start signal. Until the $RP_0$ signal is present, the flip-flop 206 generates a signal to condition AND gate 202 which provides a timing signal to control the operation of the test circuit. The presence of the $RP_0$ signal indicates the termination of the entire operation of the system (to be described below), and for this reason, its presence at the input of the flip-flop 206 causes AND gate 202 to be blocked, inhibiting the generation of the timing signal.

As described above, one function of the test circuit 10 is to ascertain whether the interim cutting patterns that are developed provide a greater return than is provided by the optimum previously-calculated cutting pattern. This "test for actual improvement" is performed by subtracting the interim return R′ from the optimum return R and sensing the sign of the difference. In FIG. 4E, a subtractor 220 provides the difference between the optimum return R (minuend) that is applied on a cable 224 from register 61 in the optimum result storage circuit 14 (FIG. 2C) and the interim return R′ (subtrahend) that is applied on a cable 225 from accumulator 54 in the interim result storage circuit 8 (FIG. 4B). When an actual improvement is present (R′ exceeds R), a "sign-" signal is provided by subtractor 220 (FIG. 4E) to an AND gate 221. The timing signal from AND gate 202 is applied through a delay 239 and through conditioned AND gate 221 to multiple AND gates 56 and 58 (FIG. 4C) via a conductor 228. Delay 239 insures that the controls of the return register 61 (FIG. 4C) is not altered until other circuits requiring the previous return have operated, as described above. These AND gates pass the interim cutting pattern $n_i'$ and the interim return R′ to registers 59 and 61 in the optimum result storage circuit 14. As described above, this operation always occurs during step 1 of the illustrative example because the optimum return register 61 (FIG. 4C) is initially reset to 0 (which is less than the interim return R′ regardless of the interim cutting pattern $n_i'$). Data is transferred to the optimum storage circuit 14 using two conductors per bit to avoid the necessity of resetting registers 59 and 61.

The above description of the operation of the detailed circuits of FIGURE 4 corresponds to the first step of the illustrative example. In step 2 of the example, a "test for possible improvement" is performed by tentatively decrementing the highest order, non-zero alement $p$ of the interim cutting pattern $n_i'$ and cutting the remainder L′ plus the length $l_p$ (provided by the decrement) with the next lower-order length $l_{p+1}$ according to:

$$(L'+l_p)\cdot(p_{p+1})-(p_p)\cdot(l_{p+1})>(l_{p+1})\cdot\max(0, R-R')$$

This expression is rewritten to more closely correspond to the circuitry as:

$$[L'+l_p]\cdot[p_{p+1}]-[l_{p+1}]\cdot[p_p+\max(0, R-R')]>0$$

As described above, ring counter 82 in the operand control circuit 4 (FIGURE 4D) has been reset to provide an output indicative of the highest order non-zero interim cutting pattern element ($n'_p$). The output of ring counter 82 is applied on cable 84 to condition an appropriate AND gate 160 (including $160_1$, $160_2$ . . . $160_n$) in the input data storage circuit 2 (FIGURE 4A). In step 2 of the illustrative example, the highest order non-zero interim cutting pattern element is the fourth element. That is, $n_4'$ was determined to be 1 and $n'_5$ to be 0 in the lexicographic ordering process. Thus, the AND gate 160 connected to the length $l_4$ register 42 is conditioned by the $P_4$ data select signal from the operand control circuit 4 (FIGURE 4D). As described above, the circuits in FIGURE 4 are shown in a generalized form for $n$ lengths and prices. Since $n=5$ in the illustrative example, $l_4$ corresponds to $l_{n-1}$, and AND gate $160_{n-1}$ is conditioned. The length ($l_p$) data provided by the AND gate is applied through an OR gate 164 and a cable 232 as one input to an adder 230 in the test circuit 10 in FIGURE 4E. The other input to the adder is supplied from the L′ register 52 in the interim result storage circuit 8 (FIGURE 4C). The sum $(L'+l_p)$ that is developed by the adder is applied to a multiplier 237 where the product of this sum and the price $p_{p+1}$ is performed in accordance with the above expression. The price is selected by the $P_{n-1}$ data select signal from the operand control circuit 4 (FIGURE 4D) as applied on cable 84 to AND gates 140 in FIGURE 4A. Since, in the example, the highest-order, non-zero element of the interim cutting pattern is $n_4'$, price $p_5$ is selected and applied on a cable 239 to multiplier 237 in test circuit 10 (FIGURE 4E). The result developed by the multiplier corresponds to $[L'+l_p]\cdot[p_{p+1}]$ and forms the minuend of a subtraction whose subtrahend is $[l_{p+1}]\cdot[p_p+\max(0, R-R')]$. The output of multiplier 237 is applied as the numerator input of a subtractor 240. The subtrahend of the subtraction is developed by a multiplier 242 whose factors are $[l_{p+1}]$ and $[p_p+\max(0, R-R')]$. The $l_{p+1}$ data is selected by the AND gate 86 (FIGURE 4A) which is conditioned by the timing signal from the operand control circuit 4 (FIGURE 4D). In step 2 of the illustrative example, the $P_{n-1}$ data select signal conditions AND gate $86_n$ to pass the length $l_n$ data from register 42. Thus, in step 2 of the example, the length $l_5$ data is selected. This selected data is applied through OR gate 88 (FIGURE 4A) and cable 244 to multiplier 242 (FIGURE 4E). The second input to this multiplier corresponds to $[p_p+\max(0, R-R')]$ which is developed by an adder 246 (FIGURE 4E) by summing the price $(p_p)$ data that is selected by one of a group of AND gates 248 (including $248_1$, $248_2$ . . . $248_n$) in FIGURE 4A and data corresponding to the maximum of $R-R'$ and 0. In step 2 of the illustrative example, the price $p_4(p_{n-1})$ data is selected by AND gate $248_{n-1}$ which is conditioned by the $P_4(P_{n-1})$ data select signal from the operand control circuit 4 (FIGURE 4D). The selected data is applied through an OR gate 250 (FIGURE 4A) and a cable 252 to adder 246 (FIGURE 4E). The second input to this adder corresponds to $R-R'$, when $R-R'$ exceeds 0. This difference $(R-R')$ is developed in subtractor 220, as described above. An AND gate 254 is conditioned by a signal that is produced by an inverter 256 when the "sign-" signal is not present (when the difference $R-R'$ is positive). When the difference $R-R'$ is negative, AND gate 254 is blocked and adder 246 merely passes the $p_p$ data to multiplier 242. The product developed by multiplier 242 is then subtracted from the product developed by multiplier 146 in subtractor 240. The "test for possible improvement" is passed when the subtractor provides a positive difference and is failed when a negative difference is produced. The "sign-" output of the subtractor is sensed by a pair of AND gates 258 and 260 which are conditioned by the timing signal from AND gate 202. The "sign-" signal from subtractor 240 is directly applied to AND gate 258 and is applied to AND gate 260 through an inverter 262. Thus, AND gate 258 develops an output signal when the test is failed (the output of subtractor 240 is negative) and AND gate 260 develops an output signal when the test is passed (the output of subtractor 240 is positive). Delay 239 (FIGURE 4E) suppresses the alternative of data in the optimum return register 61 (FIGURE 4C) until the result of the operation of adders 230 and 246, multipliers 237 and 242 and subtractor 240 is sensed in AND gates 258 and 262. The "pass" and "fail" signals developed by AND gates 258, 260 are directed to the circuits in FIGURES 4B, 4C and 4E to control their subsequent operation.

When the "test for possible improvement" is failed, as illustrated in step 3 of the example, the corresponding element of the interim cutting pattern is deleted and the remainder L′ and interim return R′ are modified to correspond to the deletion. Then the test is performed again on the revised cutting pattern data. In the example, the test is failed when first performed on the fourth-order $(l_4, p_4, n'_4)$ data and the $n'_4$ cutting pattern element is deleted, resulting in cutting patterns: 2, 0, 0, 0, 0. The "test for possible improvement" is then performed again by tentatively decrementing the highest-order, non-zero cutting pattern element $(n'_1)$ by one.

These operations are performed by the detailed circuits in FIGURE 4 under the control of the "fail" signal. This signal is applied to control the output of a pair of multipliers 262 and 264 in FIGURE 4B whose output data alters the remainder L′ and interim return R′ data that is stored in register 52 and accumulator 54, respectively. The product of the length $l_p$ and the interim cutting pattern element (number) which is to be deleted $(n'_p)$ is developed by multiplier 262 to provide a correction for the remainder L′. The length $l_p$ ($l_4$, in the example) is applied to the multiplier on cable 232 from OR gate 164 (FIGURE 4A). The corresponding cutting pattern element ($n'_4$ equals 1 in the example) is selected by a group of multiple AND gates 266 (including $266_1$, $266_2$ . . . $266_n$), the appropriate one of which is conditioned by the data select signal ($p_4$, in the example) from the operand control circuit 4 (FIGURE 4D). The output of the conditioned AND gate 266 is passed by an OR gate 268 and a cable 269 as the second input to multiplier 262. The product $(l_p)\cdot(n_p')$ developed by the multiplier is passed by an AND gate 271 (which is conditioned by the "fail" signal) and is applied through an OR gate 270 to an adder 272 where it is combined with the previous remainder L′ which is applied from the L′ register 52 in FIGURE 4C. The sum is applied through an AND gate 275 and an OR gate 124 (FIGURE 4B) to the result register 119 as the corrected remainder corresponding to a deletion of the cutting pattern element $n_p$ for which the "test for possible improvement" failed. The signal for AND gate 202 (FIGURE 4E) is applied through a delay 273 to condition AND gate 275. Since the signal that is applied to delay 273 occurs at the time of the "fail" signal, AND gate 275 is conditioned after adder 272 has completed its operation (or the adder input is applied by the "fail" signal). The signal for AND gate 202 (FIGURE 2E) and, hence, the "pass" and "fail" signals are sufficiently long in duration to enable adder 272 (FIGURE 2B) to operate and delay 273 provides an output conditioning signal to AND gate 275 before the termination of these signals. The signal from AND gate 202 (FIGURE 4E) is applied through OR gate 121 and the leading edge of this signal is passed by capacitor 123 to reset the result register 119 before data is applied through OR gate 124. The timing signal from delay 273 (which causes data to be entered into the result register 119) is applied through an OR gate 125 and through another delay 127 to condition AND gate 129 at a time after data is applied to the result register. Thus, the data in result register 119 is transferred to the L′ register 52. The interim return R′ accumulator 52 (FIGURE 4C) is also corrected to compensate for the deletion of cutting element $n'_p$ by subtracting $(p_p)\cdot(n_p')$ from the previous interim remainder R′. The price $p_p$ data and interim cutting pattern element $(n'_p)$ data are applied to multiplier 264 (FIGURE 4B) on cables 252 and 269, respectively. The product that is developed by the multiplier is applied through an AND gate 277 (which is conditioned by the "fail" signal) to a complementor 274. The complementor output is applied through OR gate 148 to the interim return R′ accumulator 54. The signal from AND gate 202 (FIGURE 4E) is applied through OR gate 147 as the "add" pulse to the accumulator 54. Thus, subtraction is performed by the well-known procedure of complementing and adding (accumulating).

Since the remainder L′ and interim return R′ have been altered to compensate for a deletion of the interim cutting pattern element which resulted in a failure of the "test for possible improvement," the deletion, itself, can now be performed. The "fail" signal is applied through a delay 280 in FIGURE 4E to a group of AND gates 282 (including $282_1$, $282_2$ . . . $282_n$) in FIGURE 4C. The delay insures that the above-described operations are completed before the AND gates 282 are conditioned. The timing signals from the operand control circuit 4 (FIGURE 4D) are also applied to corresponding AND gates 282 to cause a signal to be provided by the AND gate that corresponds to the interim cutting pattern element $n_p'$ which resulted in the failure of the test. This signal resets the appropriate interim cutting pattern counter 50. The "fail" signal from delay circuit 280 (FIGURE 4E) is applied through another delay 284 and OR gate 172 to single-shot 174 to initiate the control of the next "test for possible improvement." The delay 284 insures that the deletion of the interim cutting pattern element $n'_p$ is completed before the next test is begun.

When the "test for possible improvement" is passed, as illustrated in step 4 of the example, the interim cutting pattern element $n'_p$ is actually decremented by one, and the remainder L′ and interim return R′ are altered to compensate for the deletion. Then the altered remainder L′ is lexicographically ordered among the higher-order lengths. These operations are performed by the detailed circuits in FIG. 4 under the control of the "pass" signal from AND gate 260 (FIGURE 4E). This signal is applied to condition an AND gate 290 in FIGURE 4B which passes the length $l_p$ that corresponds to the element $n'_p$ of the interim cutting pattern which is to be decremented. The length data passed by AND gate 290 is applied through OR gate 270 to added 272 wherein the remainder L′ is combined with the length $l_p$. The adder output is applied through AND gate 275 and OR gate 124 to the result register 119 as the altered remainder. The data in the result register is then applied to the L′ register 52 (FIG. 4C). The operation of adder 272, AND gate 275, OR gate 124, result register 119 and AND gate 129 is similar to the operation described above because the same timing signal enters delay 273 and OR gate 121 regardless of whether the "test for possible improvement" is passed or failed. Similarly, the interim return R′ accumulator 54 is altered by the subtraction of an amount equal to the price $p_p$ that corresponds to the decremented element $n_p'$ of the cutting pattern. The "pass" signal conditions an AND gate 292 (FIGURE 4B) which passes the price $p_p$ to a complementor 294. The complemented price is applied through OR gate 148 to the interim return R′ accumulator 54, wherein it is added to the previous return. The signal from AND gate 202 (FIG. 4E) is applied through OR gate 147 as the "add" pulse to the accumulator. The complementing operation effectively results in the subtraction of $p_p$ from the previous return. The "pass" signal is also applied to a group of AND gates 296 (including 296$_1$, 296$_2$ . . . 296$_n$) in FIGURE 4C. The timing signals from the operand control circuit 4 (FIGURE 4D) are applied to corresponding AND gates 296 to cause a signal to be provided by the AND gate that corresponds to the interim cutting pattern element $n_p'$ which resulted in the passing of the test. This AND gate provides an output signal to the "down" input of the associated interim cutting pattern counter 50, causing the value in this counter to be decremented by one. The pass signal is also applied through a delay 298 circuit (FIG. 4B) and OR gates 98 and 102 to trigger single shot 100 and, thus, initiate another lexicographic ordering routine. The delay circuit 298 insures that the appropriate interim cutting pattern counter 50 is decremented before lexicographically ordering the remainder. The subsequent lexicographic ordering only affects the higher-order cutting pattern element as ring counter 82 is left in the position corresponding to the decremented element of the cutting pattern and, when lexicographically ordering, the next-higher-order length $l_{p+1}$ is selected (by AND gate 86 in FIG. 4A) when the $P_p$ timing signal is provided.

The above-described operations are repeated, as shown in steps, 5, 6, and 7 of the illustrative example until a "test for possible improvement" is failed which causes the deletion of the last non-zero element of the interim cutting pattern. As shown in step 8 of the illustrative example, the process is terminated when the interim cutting pattern contains only zeros. This situation is sensed in the detailed circuits of FIGURE 4 when the $RP_0$ signal is provided by AND gate 178$_1$ in FIGURE 4D. When the interim cutting pattern stored in counters 50 (FIG. 4C) contains only zeros, each AND gate 178 is conditioned, causing the signal on lead 176 to flow through these AND gates to generate the $RP_0$ signal. This signal resets the ring counter 82 to its $P_0$ stage and, as described above, is applied on lead 204 to flip-flop 206 (FIG. 4E). The presence of a signal at the input to the flip-flop causes its output signal to be removed and, hence, blocks AND gate 202 to inhibit the operation of the timing circuit 170. The $RP_0$ signal from AND gate 178$_1$ (FIG. 4D) is also applied through a capacitor 300 (FIG. 4C), which develops a "ready" output pulse. The presence of this pulse indicates that the data in the optimum result storage circuit 14 is available for use and that the system operation is finished.

Thus, in the inventive computer, input data is selected by an operand control circuit and calculations are performed on the selected data by an arithmetic unit to develop interim results. These results are then analyzed and the structure of the results (the relationship between the results) controls the selection of input data for subsequent operations. In the preferred embodiment, the structure of the interim cutting pattern $n_i'$ controls the selection of the length $l_i$ and price $p_i$ data for subsequent operations. The speed of operation of the system is enhanced by avoiding certain operations which are incapable of contributing to the results. This occurs in the preferred embodiment when a failure of the "test for possible improvement" inhibits the development of many of the possible cutting patterns. As the interim results are generated, they are analyzed with respect to the optimum results that were previously generated and, when an improvement is indicated, the previously-generated results are replaced by the improved interim results. This is accomplished in the preferred embodiment of the invention when the interim return R′ exceeds the previously-generated optimum return R. In this case, the optimum cutting pattern $n_i$ is replaced with the interim cutting pattern $n_i'$.

The inventive machine organization is, therefore, extremely useful in solving the broad class of problems which involve iterative calculations, such as the stock cutting problem which is described with respect to the preferred embodiment.

While the invention has been particularly shown and described with reference to a preferred embodiment thereof, it will be understood by those skilled in the art that various changes in form and details may be made therein without departing from the spirit and scope of the invention.

What is claimed is:

1. A computing system for providing indications of the cutting pattern $n_i$ which produces the highest return R when items of corresponding lengths $l_i$, having corresponding prices $p_i$, are cut from a given length L of material comprising, in combination:

input data storage means for storing at given addresses therein data representing the lengths $l_i$ and the corresponding prices $P_i$ in the decreasing order of return per unit length $p_i/l_i$;

interim result data storage means for storing at given addresses therein data representing interim cutting patterns $N_i'$, interim returns R′, and interim lengths L′ to be cut;

optimum data storage means for storing data representing the best cutting pattern $n_i$ and the best return R;

means for causing the given length of material L to be stored as the initial interim length L′ in said interim data storage means;

first selectively-controllable arithmetic means responsive to the storage in said input data storage means and said interim result storage means of data representing $l_i$, $p_i$ and L′ for lexicographically ordering the stored length L′ to produce data representing an interim cutting pattern $n_i'$ and an altered interim length L′ for storage in the interim data storage means;

second arithmetic means responsive to the storage in said input data storage means and said interim result storage means of data representing $p_i$ and $n_i'$ and to the completion of each operation of the first arithmetic means for calculating data representing an interim return R′ for storage in the interim result storage means;

first selectively-controlled test means for comparing the data representing R and R′ stored respectively in said interim result storage means and said optimum data storage means for providing an indication of an improved return when R exceeds R′;

means responsive to the presence of the indication of an improved return for replacing the stored data representing $n_i$ and R with the stored data representing $n_i'$ and R′;

second selectively-controlled test means responsive to the storage in said input data storage means, in said interim result storage means and in said optimum data storage means of data representing $n_i$, $l_i$, $p_i$, R, R′ and L′ for providing an indication of a possible improvement when $$(L'+l_p)\cdot(p_{p+1})-(p_p)-(l_{p+1}) \text{ exceeds } (l_{p+1})\cdot\max(0, R-R')$$

where $p$ denotes the highest non-zero order $i$ in the cutting pattern $n_i'$ and to provide an indication of no possible improvement when the inequality fails;

operand control means responsive to the presence of the indication of a possible improvement and to the stored data representing $n_i'$, L′ and $l_i$ and having an address-selecting relationship to said input data storage means and to said interim result data storage means determined by said stored data for selectively effecting the operations of (1) decrementing the stored data representing $n_p'$ by one, (2) selectively controlling the first arithmetic means to increment the stored data representing L′ by an amount equal to $l_p$, and (3) lexicographically ordering the incremented data representing L′ among those lengths $l_i$ for which $i$ exceeds $p$;

and means responsive to the indication of no improvement possible and controlling the storage of data representing $n_i'$, L′, $l_i$, R′ and $p_i$ in the respective storage means therefor for replacing the stored data representing $n_p'$ with zero, for incrementing the stored data representing L′ by an amount equal to the product of the replaced value $n_p'$ and $l_p$, for decrementing the stored data representing R′ by an amount equal to the product of the replaced value $n_p'$ and $p_p$, and for controlling the second test means to cause it to repeat its operation.

2. A computing system comprising, in combination:

a plurality of simultaneously-addressable input data storage means, each having a plurality of addressable storage locations;

arithmetic means responsive to the input data storage means for developing result data based upon selected input data;

addressable result storage means responsive to the arithmetic means for storing said result data at locations in said result storage means related to the locations in the input data storage means which contain the selected input data;

and operand control means responsive to the state of the result storage means and having an address-selecting relationship to said input data storage means dependent upon the result data stored in said result storage means for simultaneously addressing related locations in a plurality of the input data storage means in accordance with such result data to select additional input data for subsequent application to the arithmetic means, where such additional input data selection is required to achieve an optimum result.

3. The apparatus described in claim 2 further comprising a testing means responsive to the state of the result storage means after entry therein of said result data for determining whether alteration of such result data is required in order to achieve an optimum result.

4. A computing system comprising, in combination:

addressable input data storage means having a plurality of addressable storage locations;

arithmetic means responsive to the input data storage means for developing result data based upon selected input data;

addressable result storage means responsive to the arithmetic means for storing the result data developed by said arithmetic means during separate operations at locations in said result storage means related to the locations in the input data storage means which contain the selected input data;

and operand control means responsive to the state of the result storage means and having an address-selecting relationship to said input data storage means dependent upon the result data stored in said result storage means during separate operations of said arithmetic means for addressing the input data storage means in accordance with said result data to select input data for subsequent application to the arithmetic means, where such additional input data selection is required to achieve an optimum result.

5. The apparatus described in claim 4 further comprising a testing means responsive to the state of the result storage means after entry therein of said result data for determining whether alteration of such result data is required in order to achieve an optimum result.

6. A computing system comprising, in combination:

addressable input data storage means having a plurality of addressable storage locations;

arithmetic means responsive to the input data storage means for developing interim result data based upon selected input data;

addressable interim result storage means responsive to the arithmetic means for storing said interim result data at locations in said interim result storage means related to the locations in the input data storage means which contain the selected input data;

operand control means responsive to the state of the interim result storage means and having an address-selecting relationship to said input data storage means dependent upon the interim result data stored in said interim result storage means for addressing the input data storage means in accordance with such interim result data to select additional input data for subsequent application to the arithmetic means;

optimum result storage means capable of being selectively operated to store interim result data stored in the interim result storage means;

and means for selecting the data in the interim result storage means to be stored in the optimum result storage means when the interim result data more closely corresponds to predetermined data than does the ostensibly optimum result data stored in the optimum result storage means.

7. The apparatus described in claim 6 further comprising a testing means responsive to the interim result data in the interim result storage means for altering such interim result data when such alteration is required to achieve an optimum result.

8. A computing system comprising, in combination:
a plurality of simultaneously-addressable input data storage means, each having a plurality of addressable storage locations;
arithmetic means responsive to the input data storage means for developing result data based upon selected input data;
addressable result storage means responsive to the arithmetic means for storing said result data at predetermined locations in said result storage means;
and operand control means responsive to the state of the result storage means and having an address-selecting relationship to said input data storage means dependent upon the result data stored in said result storage means during separate operations for simultaneously addressing predetermined locations in a plurality of the input data storage means in accordance with said result data to select additional input data for subsequent application to the arithmetic means, where such additional input data selection is required to achieve an optimum result.

9. A computing system comprising, in combination:
a plurality of simultaneously-addressable input data storage means, each having a plurality of addressable storage locations;
arithmetic means responsive to the input data storage means for developing result data based upon selected input data;
addressable result storage means responsive to the arithmetic means for storing said result data at predetermined locations in said result storage means;
and operand control means responsive to the state of the result storage means and having an address-selecting relationship to said input data storage means dependent upon the result data stored in said result storage means for simultaneously addressing predetermined locations in a plurality of the input data storage means in accordance with said result data to select additional input data for subsequent application to the arithmetic means, where such additional input data selection is required in order to achieve an optimum result.

10. The apparatus described in claim 9 further comprising a testing means responsive to the state of the result storage means after entry therein of said result data for effecting alteration of such result data when the same is required in order to achieve an optimum result.

11. A computing system comprising, in combination:
addressable input data storage means;
arithmetic means responsive to the input data storage means for developing result data based upon selected input data;
addressable result storage means responsive to the arithmetic means for storing said result data at predetermined locations in said result storage means;
and operand control means responsive to the state of the result storage means after entry therein of the result data that is developed by the arithmetic means during separate operations and having an address-selecting relationship to said input data storage means dependent upon such result data for addressing the input data storage means in accordance with said result data to select additional input data for subsequent application to the arithmetic means, where such additional input data selection is required to achieve an optimum result.

12. The apparatus described in claim 11 further comprising a testing means responsive to the state of the result storage means after entry therein of said result data for altering such result data under predetermined conditions as may be required to achieve an optimum result.

References Cited

UNITED STATES PATENTS

| | | | |
|---|---|---|---|
| 3,030,019 | 4/1962 | Smith | 235—157 |
| 3,223,980 | 12/1965 | Gunderson et al. | 340—172.5 |

ROBERT C. BAILEY, *Primary Examiner.*

R. RICKERT, *Assistant Examiner.*